Figure 1:
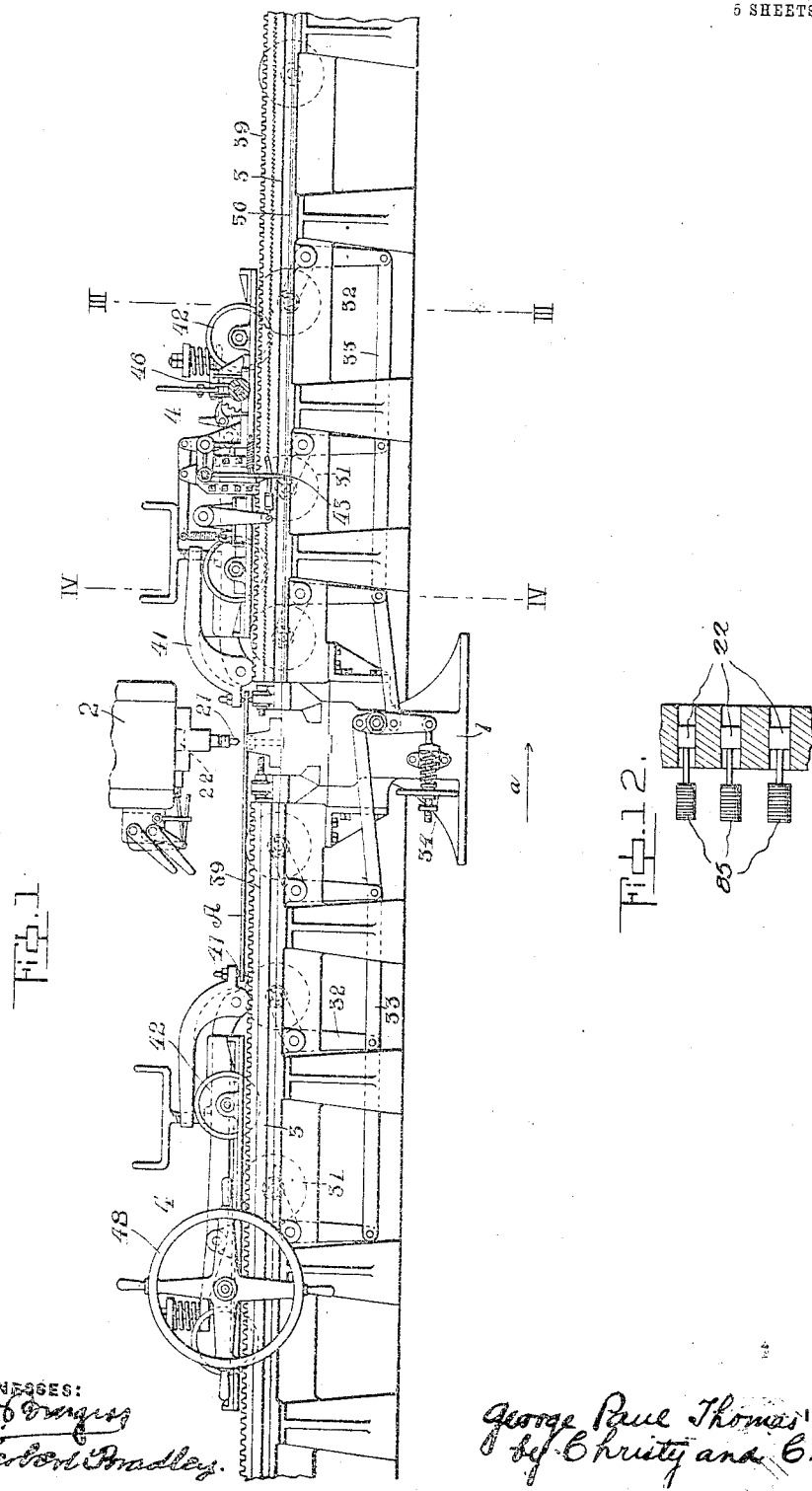

No. 835,123.

PATENTED NOV. 6, 1906.

G. P. THOMAS.
PUNCHING MACHINE.
APPLICATION FILED DEC. 20, 1905.

WITNESSES:

INVENTOR
George Paul Thomas
by Christy and Christy,
Atty's

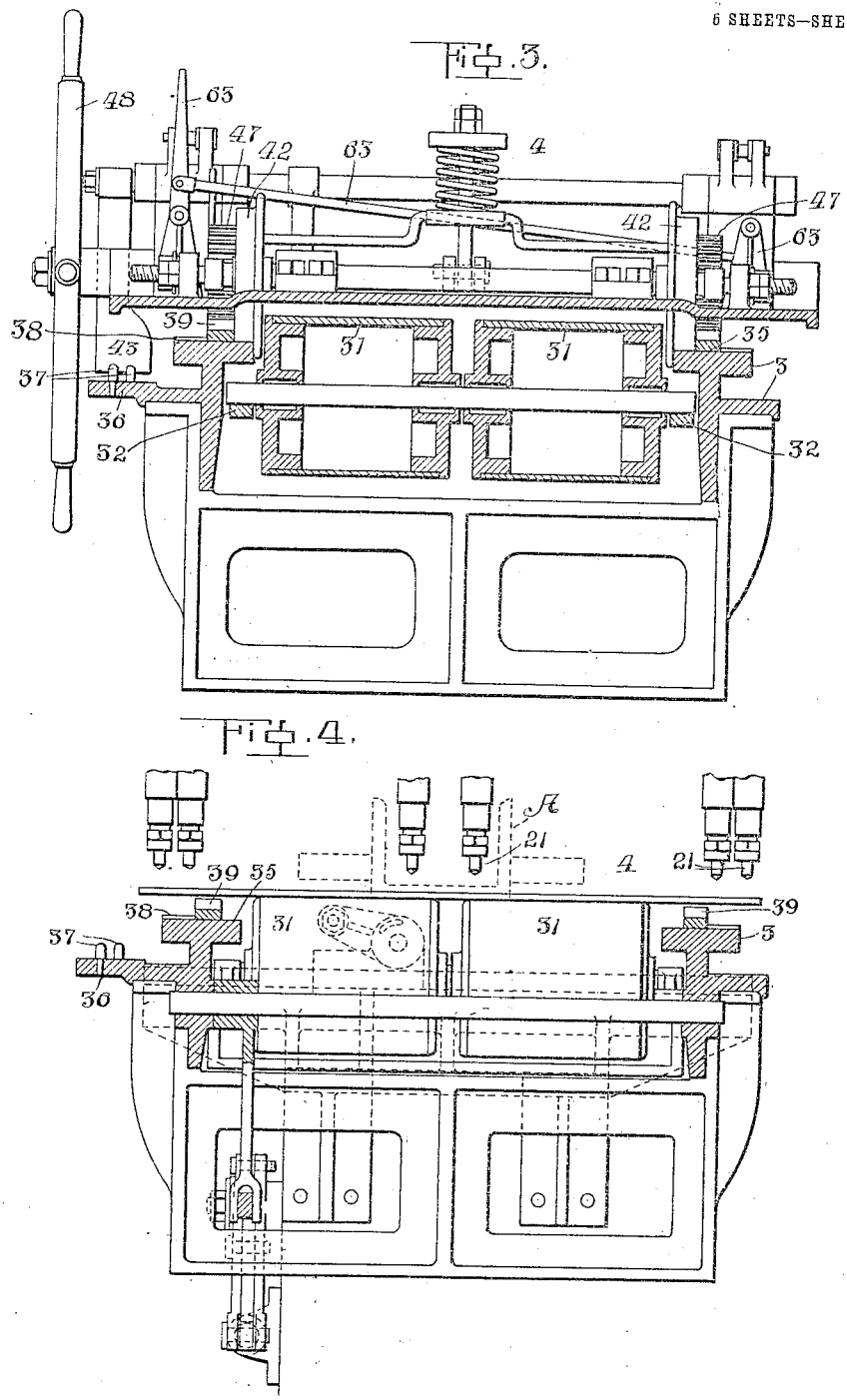

No. 835,123.  
PATENTED NOV. 6, 1906.
G. P. THOMAS.  
PUNCHING MACHINE.  
APPLICATION FILED DEC. 20, 1905.
5 SHEETS—SHEET 4.
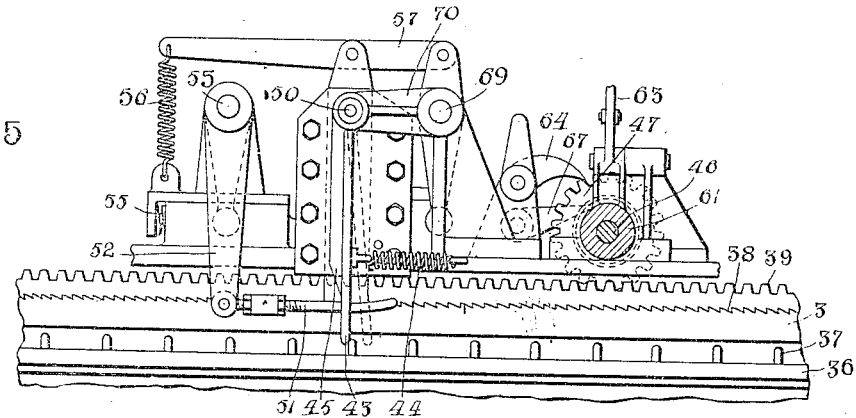
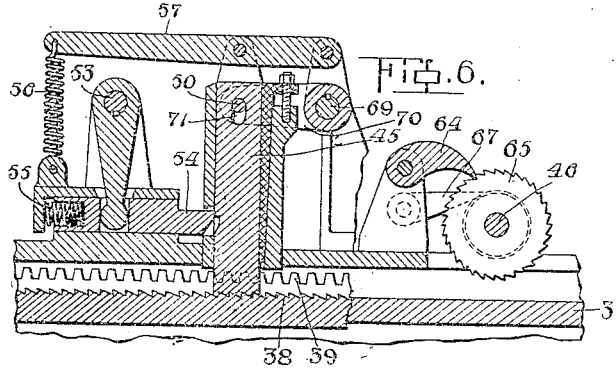
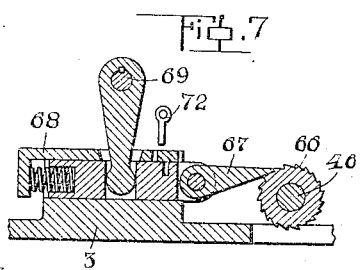
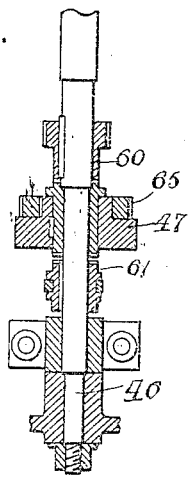
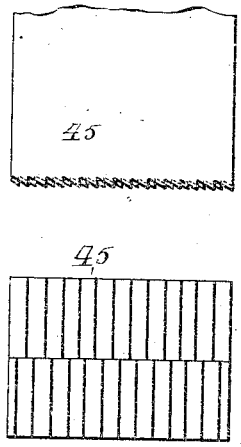
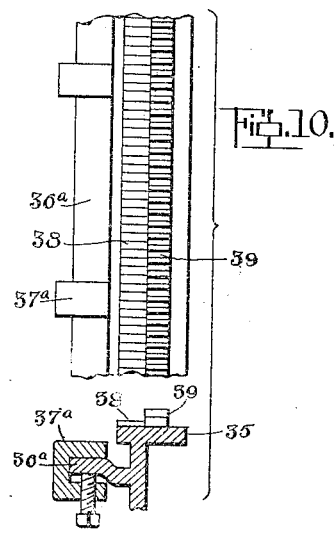
WITNESSES:
George Paul Thomas INVENTOR  
by Christy and Christy,  
Att'y's

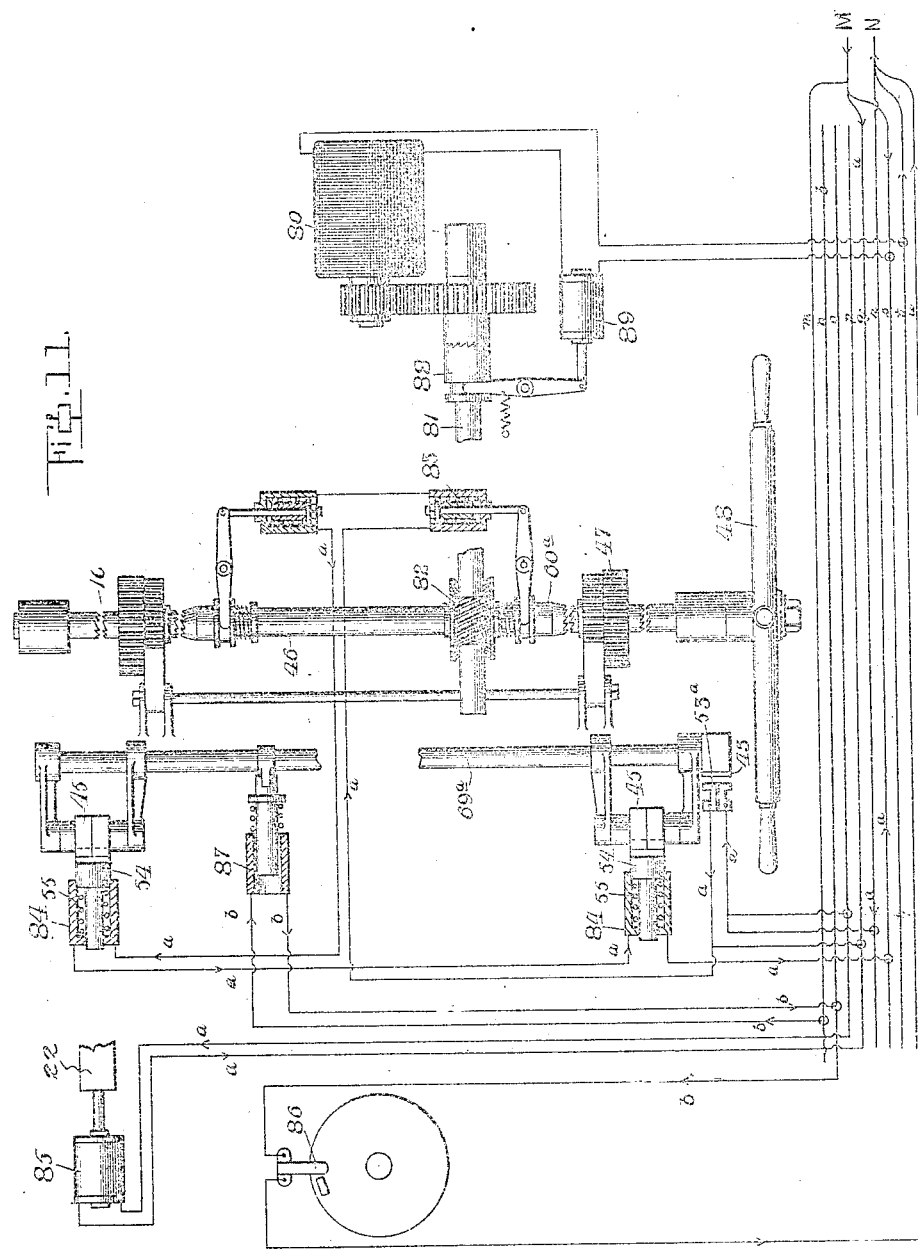

ately two in number,) 4. It will be under-
UNITED STATES PATENT OFFICE.

GEORGE PAUL THOMAS, OF PITTSBURG, PENNSYLVANIA.

PUNCHING-MACHINE.

No. 835,123.          Specification of Letters Patent.          Patented Nov. 6, 1906.

Application filed December 20, 1905. Serial No. 292,643.

*To all whom it may concern:*

Be it known that I, GEORGE PAUL THOMAS, a citizen of the United States, residing at Pittsburg, in the county of Allegheny and State of Pennsylvania, have invented or discovered certain new and useful Improvements in Punching-Machines, of which improvements the following is a specification.

My invention relates to improvements in punching-machines; and the object of my improvements is a more efficient device of the nature indicated than has heretofore been employed and one in which construction is simple and operation readily effected.

In the accompanying drawings, which form part of this specification, Figure 1 shows the machine in side elevation. Fig. 2 is a plan view and on larger scale of one of the carriages and a portion of the table Fig. 2ª illustrates on still larger scale a detail in the spacing mechanism shown in Fig. 2. Figs. 3 and 4 are views of the machine in vertical section, and on larger scale than Fig. 1, the planes of section being indicated on Fig. 1 at III III and IV IV, respectively. Figs. 5, 6, and 7 illustrate details of the brake and spacing device in one form. Fig. 8 shows the main shaft and its connections detached. Fig. 9 illustrates on larger scale the holding-detents in side elevation and in plan. Fig. 10 shows in plan and in section alternative means for tripping the finger of the brake mechanism presently to be described. Fig. 11 shows diagrammatically alternative operative means as well as a correlation and interdependence of operative parts, and Fig. 12 shows in horizontal section a fragment of the tool-carrier with automatic gag-operating means such as are indicated in Fig. 11.

The various structural parts which reappear in the several figures bear throughout the same reference characters.

The invention herein described relates to the construction of punching-machines. It will be understood, however, in the course of the specification that the several features of the invention are broadly applicable not only to punching-machines, but to machines constructed and operated after the same manner or upon the same general principles.

The machine which is shown in the drawings consists, essentially, of a stationary block or anvil 1, a vertically-movable tool-carrier 2, equipped with punches 21, an extended work-supporting bed 3, suitably supported, and a carriage or carriages, (preferably two in number,) 4. It will be understood that suitable means are employed for moving the tool-carrier with its punches to and from the anvil. Means to this end are well known and are here neither shown nor described.

The table 3 is provided with a series of bearing-surfaces, preferably in the form of rolls 31. These bearing-surfaces support the work while it is progressively fed over the table and beneath the tool-carrier. It has been found in tables such as are ordinarily employed for this purpose that the weight of the article to be operated on (which throughout this specification will for the sake of brevity be termed the "work") is so great as to throw the parts of the machine out of perfect alinement, and while this is a matter of comparative inconsequence in a manually-operated machine it becomes an important matter and one which actually defeats or seriously interferes with the successful and satisfactory operation of a machine moving automatically. In order to overcome this defect, I mount these bearing-surfaces (rolls 31) to move vertically, and I so connect the whole that downward movement of one in response to the weight of the work produces equal downward movements of all. Furthermore, I mount these bearing-surfaces to move downward against spring tension, and I provide means for adjusting the height of the whole, so that while the weight of the work may in several instances vary and there is accordingly no uniformity in the extent of downward movement by suitable adjustment the work may be brought to the desired level or height upon the table that it shall be positioned properly upon the anvil for the punching operation. To this end rolls 31 are journaled in the arms of bell-crank levers 32, fulcrumed in the bed. The opposite arms of these several levers are connected by links 33, and the whole is held in elevated position by a spring-backed lever-arm whose normal position is adjustable by means of a hand-wheel 34.

It will be understood that a bed such as I have described may be advantageously employed not only in a punching-machine, but in any tool-operating machine and (generally) in any machine in which work is to be supported and accurately positioned.

The carriage or carriages 4 are mounted upon the table 3. They are adapted to engage the work A to travel upon the table and to bring successive portions of the work into position beneath the punches. It is the object in constructing this feed mechanism of a punching-machine for automatic operation that at certain predetermined intervals the carriage shall come to rest in its traverse upon the bed, allowing the work to lie immovable upon the anvil while the punches operate. The work may, for example, be a boiler-plate in which it is desired to punch at predetermined intervals a series of suitably-spaced rivet-holes. The means for thus stopping the carriage is conveniently termed the "brake" device, and a table equipped with such a device is called a "spacing-table."

Prior to my invention punching-machines had been equipped with brake devices. Among such prior devices is that in which motion of the carriage is arrested by engagement of a finger borne by the carriage with a succession of pins suitably spaced and mounted in the table. I employ a similar finger-and-pin construction not, however, to arrest motion, but to set in operation other parts which accomplish this end more effectively.

In Fig. 1 two carriages 4 are shown, each equipped with tongs 41 for engaging opposite ends of the work A and both mounted upon wheels 42, which engage tracks 35, suitably arranged in table 3 to allow the carriages traveling upon them to bring the work to the desired successive positions beneath the punch. I show and describe my brake device applied to one of these carriages 4. Such application is sufficient for the practical requirements of this machine. It will be understood that by duplication as many brake devices may be employed as conditions of service may render necessary or desirable.

The means which I employ as a brake device for stopping the carriage and locking it in fixed position upon the table is a detent and rack. The detent 45 is preferably mounted in carriage 4 and is movable vertically therein to and from interlocking engagement with rack 38, which is mounted upon the table and extends thereon throughout the range of movement of the carriage-borne detent 45. The means for operating these interlocking parts may be briefly described.

Upon table 3, conveniently arranged upon one side thereof and extending longitudinally thereon throughout the range of movement of that carriage which is equipped with the spacing device, is a spacing-plate 36. This spacing-plate is provided with a series of holes wherein the pins 37 are set. As shown in Fig. 2, these holes may be arranged in a series of rows and the holes of the adjacent rows arranged in staggered positions. This is a known expedient for obtaining more delicate adjustment than would be possible were the holes arranged in a single row, for the practical minimum width of each hole may exceed the desired interval between successive positions of the pins; but I employ in connection with such a series of holes sets of pins 37, such as are shown in Fig. 2ª, having heads (the parts which engage the finger which is borne by the carriage) of different diameters. It will be understood that this feature permits of more delicate adjustment than could be obtained in using pins with heads of uniform size in connection with a spacing-plate perforated in like manner.

In place of a perforated spacing-plate and its equipment of pins I may, as indicated in Fig. 10, provide other means of spacing— e. g., an imperforated plate 36ª and a series of blocks 37ª, clamped at desired intervals along the edge of the plate.

Upon carriage 4 is mounted a finger 43 of such breadth and so arranged that in the traverse of the carriage it will engage the heads of the pin or pins (or other spacing device) which may be set in the spacing-plate 36. This finger is normally held in the advanced position indicated by dotted lines in Fig. 5, (a spring 44 may be employed for this purpose,) and it is so mounted in the carriage that as the latter advancing upon the table brings the finger into contact with a pin the finger will yield rearward and in so doing will set in motion means for shifting detent or detents 45 (carried, preferably, in pairs and upon either side of carriage 4) and causing them to engage correspondingly-placed racks 38, which are mounted upon the table 3. Such engagement of detents 45 and racks 38 will stop the carriage and lock it securely upon the table.

Any preferred means for shifting detent 45 upon engagement of finger 43 and the spacing device may be employed. In Figs. 1-8 I have shown mechanical means. In Fig. 11 I have shown a mechanism set in operation by electromagnets. I shall first describe the mechanical means to this end and shall refer to the electrically-operated means in more general terms, for the alternative construction will then be readily understood.

Finger 43 is mounted to swing upon a pin 50, being impelled rearward against the tension of spring 44 by engagement with a pin 37 and continued traverse of carriage 4 in the manner already described. Finger 43 in its rearward traverse engages a suitably-arranged shoulder upon rod 51, and this rod when driven rearward turns a crank-arm 52, to which it is connected, and causes a shaft 53 to rotate. Upon the rotation of shaft 53 a latch 54 is withdrawn against the tension of a spring 55 from engagement with detent 45, allowing the latter to descend in response to the tension of a spring 56 exerted through a lever 57. The engaging face of detent 45 is formed in a series of teeth spaced and arranged to engage the teeth of rack 38. The delicacy of adjustment and the accuracy of the spacing between the successive stations of the carriage will (it will be understood) depend upon the spacing of these teeth. In order to obtain greater delicacy in this respect without undue and impracticable minuteness in construction, detent 45 may be formed, as indicated in Fig. 9, in a plurality of parts, the adjacent teeth of the several parts staggered. Thus with a two-part detent each with teeth set one-eighth of an inch apart engaging a rack having teeth spaced at intervals of one-eighth of an inch the carriage may be secured at successive intervals of one-sixteenth of an inch. It will be understood that whatever degree of delicacy be attained in respect to this rack-and-detent structure it will (to secure best results) be the same as that attainable in the finger-and-pin device already described. The two-part detent shown in Fig. 9 may, it will be understood, operate as a unit or it may be operated by a double lever mechanism, as is indicated in Fig. 2. The same figure shows shaft 53 extending across carriage 4 from side to side to set in motion corresponding parts and operate rack-and-detent mechanism upon both sides of the carriage simultaneously. Such as I have said above is my preferred arrangement.

Having described the means whereby the movement of the carriage is arrested at the successive points desired, it remains to describe the means for releasing detents 45 and finger 43 from engagement with racks 39 and the spacing devices 37, respectively, to allow the carriage to advance upon the table. This releasing means may conveniently be combined, as it is in the machine illustrated, with the means for moving the carriage upon the table.

Upon table 3 rack-rails 39 are arranged, and each carriage 4 is equipped with a shaft 46, bearing cog-wheels 47, arranged to engage rack-rails 39. These cog-wheels when turned by rotation of shaft 46 cause the carriage to move to and fro upon table 3. The shaft 46 may be rotated by any preferred means. In Figs. 1-3 a hand-wheel 48 is shown for that purpose. In Fig. 1 the hand-wheel for operating the carriage on the right has for purposes of illustration been omitted, and the end of the shaft 46 is there indicated in section.

Means are provided whereby the shaft may by rotation in opposite directions effect movement of the carriage to and fro upon the table and whereby the shaft may on suitable adjustment be rotated to release the finger and detents aforesaid without imparting movement to the carriage. My preferred construction to this end is illustrated in the drawings. Clutches 60 and 61 placed upon shaft 46 and upon either side of cog-wheels 47 engage the cog-wheels to turn them forward or rearward in response to corresponding revolutions of shaft 46. Clutches 60, which by engagement with cog-wheels 47 impart forward rotation of the shaft to the wheels to move the carriage forward, are conveniently held yieldingly in operative position by springs 62. Clutches 61, which impart rearward movement, are preferably carried to and from engagement with the cog-wheels by the positive movement of lever mechanism 63. Dogs 64 may be mounted in the carriage. They are arranged to be swung to and from engagement with ratchet-wheels 65, and when in such engagement they hold the cog-wheels against backward turning. It will thus be seen that when the parts are in the position shown in Fig. 2 (clutches 61 being disengaged and dogs 64 engaging their ratchets) forward rotation of shaft 46 will effect a forward movement of the carriage; but the shaft may be turned backward without movement of the carriage. If, however, clutches 61 be shifted to engage the cog-wheels and dogs 64 be swung free of engagement with their ratchets backward rotation of shaft 46 will cause carriage 3 to move backward upon the table.

Upon shaft 46 is carried a ratchet 66, and a dog 67 is mounted in the carriage and arranged to be swung to and from engagement with this ratchet. When in such engagement, a backward turning of shaft 46 causes dog 67 to recede against the tension of a spring 68 and in so doing to impart rotary movement to a shaft 69. Shaft 69 extends across the machine from side to side. Upon it are mounted crank-arms 70. To these crank-arms detents 45 are connected, (with allowance for independent motion, as is indicated in slots 71 formed in the detents, in which pins 50 carried by the crank-arms play,) and to one of these crank-arms finger 43 is pivoted. Upon proper rotation of shaft 69 finger 43 is drawn upward and released from engagement with pin 37, (spring 44 coming into play to carry the finger forward in advance of the pin when released from such engagement to the position indicated in Fig. 5 by dotted lines.) By the same motion detents 45 are raised from racks 38 and latches 54 permitted to lock them in elevated position. Thereafter turning of shaft 69 in opposite direction will leave detents 45 elevated, but will carry finger 43 down to proper position for engaging the next succeeding spacing device 37.

The operation of the machine as thus far described may briefly be reviewed. Pins 37 with heads of suitable size have been properly set in plate 36. As shown in Fig. 1, operation has begun. The work A is held by the tongs 41 of carriages 4 and rests upon rolls 31 beneath the punches 21. Let it be supposed that the punches have acted, the brake mechanism has been released, and the carriages impelled by hand-wheels 48 have advanced until finger 43 has again been brought into contact with a pin 37. (The direction of movement is indicated by arrow *a*.) This has been accomplished through shaft 46, clutches 60, cog-wheels 47, and rack-rails 39, (clutches 61 being disengaged.) Finger 43 is now again deflected, latches 54 (see Fig. 6) are drawn aside, and detents 45 descend to engage racks 38 and in so doing lock carriage 4 in place upon the table. The punches 21 then operate. After the punching operation (the position of the clutches remaining unchanged) hand-wheel 48, carried by the forward carriage, is turned backward. Dogs 64 hold cog-wheels 47 against turning, and the rotation of the shaft 46, communicated through ratchet 66 and dog 67, turns shaft 69, causes arm 70 to rise, releasing finger 43 from the pin which it has last engaged and raising detents 45 (against the tension of springs 56) until latches 54 advance and secure the detents in place. Meanwhile spring 44 has caused finger 43 to swing forward in advance of the pin which it has last engaged. Hand-wheels 48 are then turned forward again, and as the carriages advance finger 43 descends to engage the next pin 37, which lies in its path, and upon each successive engagement of finger and pin the described chain of operation is repeated. When the work has passed through the predetermined range and the carriages are to be returned to initial positions, dogs 64 and 67 are thrown back, (and a dowel-pin 72 may serve to hold the parts in place with which dog 67 is operatively connected, finger 43 elevated from contact with the spacing device,) clutches 61 are carried into engagement with cog-wheels 47 by lever mechanism 63, and the hand-wheels are turned backward.

It will be understood that my brake device is applicable not only to the movable carriage in a punching-machine, but it is applicable in machinery generally where a movable member is to be stopped and held at predetermined point or points within the range of its motion.

Thus far I have described a brake mechanism operated by instrumentalities which are purely mechanical. In Fig. 11 I have indicated, diagramatically, how the operation of the various parts may be made to follow one upon another by means of an arrangement of electromagnets. This arrangement further permits an interdependence in the operation of the carriages, the spacing mechanism and the punches therein peculiarly fitting my improvement to this particular application.

Referring to Fig. 11, 80 is an electric motor which is mounted upon carriage 4 and is arranged to drive a power-shaft 81, which is geared at 82 to the shaft 46, already described. Revolution is imparted to cog-wheels 47 by means of clutches 60ª. These clutches may be thrown out of engagement by the operation of electromagnets 83. Finger 43 swings as before to set in motion the clamping device; but in this instance it closes an electric contact 53ª, thereupon energizing electromagnets 84, which draw latches 54 from engagement with detents 45, allowing the detents to descend, as previously described. Simultaneously with the energizing of electromagnets 84 electromagnets 83 are energized, and these break contact of clutches 60ª and allow the carriage to come to rest.

It will be understood that in the operation of punching-machines different arrangements of the punches 21 may be desired in the successive punching operations. Thus in the punching of successive lines of rivet-holes in boiler-plates it may be desired that the holes of one row shall be differently spaced from the holes of an adjacent row, and two or more "patterns" of holes may be desired in the length of such a plate. This end is accomplished in automatic machines by backing the individual punches 21 with "gags" 22, (see Figs. 1 and 12,) which are slides capable of being pushed in and drawn out in the punching-head. When pushed in, they afford backing to the several punches, causing them to operate. When drawn out, the individual punches yield as the punching-head descends and cut no hole. A suitable arrangement of circuits, such as is diagrammatically indicated in Figs. 11 and 12, permits the energizing upon the closing of contact 53ª of one or more electromagnets 85 to operate one or more of the gags 22 and effect a desired pattern of "gagged" punches immediately before the punching-head descends to perform its office.

The manner of connecting up the several electromagnets and of causing particular combinations of the several magnets to operate at predetermined intervals is not shown. Such arrangements are matters of common knowledge and constitute no part of my present invention.

Contact 53ª is broken to release finger 43, detents 45, and close clutch 60ª by means of a second contact 86, which is made consequent upon the completion of each successive punching operation. When this contact is made, electromagnet 87 is energized to cause shaft 69ª to swing, carrying finger 43 and detents 45 upward and allowing finger 43 to swing forward in response to the tension of spring 44 (shown in Fig. 5) and to break the contact 53ª. A clutch 88, connecting shaft 81 with motor 80, is controlled by an electromagnet 89. In case of stoppage of motor 80 clutch 88 is thrown open (this may be effected by spring tension, for example) and the carriage thus allowed to come to a stop without injury.

All of the electric circuits alluded to in describing the series of electromagnets may originate in feed-wires M and N. These are shown diagrammatically, feeding directly or indirectly a number of strands $m, n, o, p, q, r, s, t$, and $u$, which will be understood to extend along table 3, that traveling contacts borne by carriage 4 may bear upon them. Thus motor 80 is energized through contacts traveling upon wires $s$ and $t$, solenoids 83, 84, and 85 are energized through contacts traveling upon wires $q, r, o$, and $p$, while solenoid 87 is energized through contacts traveling upon wires $m, n$, and $u$. It will readily be understood that thus the swinging of finger 43 by the advance of the carriage and contact with the spacing device 37 effects the stopping of the table and the desired and predetermined shifting of gags in the punching-head and that upon the completion of each punching operation finger 43 and detents 45 are automatically released and the carriage set in motion in consequence thereof. As in the mechanically-controlled form already described, the carriages are driven rearward by hand-power, the current having been previously cut off.

I claim as my invention—

1. A work-sustaining table provided with a plurality of yielding bearing-surfaces and means for causing said bearing-surfaces to yield in unison in response to the weight of the work when placed upon any one or more of said bearing-surfaces, substantially as described.

2. In a work-sustaining table the combination of a plurality of bearing-rolls carried in the surface of said table and arranged to yield against spring tension when subjected to the weight of work placed upon them, means for causing said rolls to yield in unison when work is placed upon any one or more of them, and means for adjusting such spring tension, substantially as described.

3. In a tool-operating machine the combination of a tool-carrier, a work-sustaining table provided with yielding bearing-surfaces, means for causing said bearing-surfaces to yield in unison in response to the weight of the work resting upon any one or more of them, and means for adjusting the position of said bearing-surfaces to bring the work to position relative to said tool-carrier, substantially as described.

4. In a tool-operating machine the combination of a tool-carrier, a work-sustaining table provided with yielding bearing-surfaces, means for causing said bearing-surfaces to yield in unison in response to the weight of the work resting upon any one or more of them, means for adjusting the position of said bearing-surfaces within said table, and means for advancing the work upon said table to operative position relative to said tool-carrier, substantially as described.

5. A spacing-table for a tool-operating machine provided with a work-engaging carriage traveling thereon, means for stopping said carriage upon said table at predetermined intervals in the range of its movement, a plurality of yielding bearing-surfaces carried by said table, means for causing said bearing-surfaces to yield in unison in response to the weight of the work resting upon any one or more of them and means for adjusting the position of said bearing-surfaces within said table, substantially as described.

6. A brake device for a carriage movable upon a bed which consists of interlocking parts borne by said carriage and bed, means operated by the traverse of the carriage for bringing said parts into interlocking position, and means for separating said interlocking parts.

7. In a tool-operating machine which includes a stationary member and a movable member which traveling upon the stationary member carries the article to be operated on to successive operative positions, a brake device comprising interlocking parts carried by said stationary and movable members, means operated by the traverse of the movable upon the stationary member for bringing said parts into interlocking position at successive points in the traverse of the movable member, and means for separating said interlocking parts, substantially as described.

8. In a tool-operating machine which includes a stationary member and a carriage for engaging the article to be operated on and for traveling upon the stationary member to bring the said article to successive operative positions, interlocking parts carried by said stationary member and carriage, means operated by the traverse of said carriage for bringing said parts into interlocking position at successive points in the traverse of said carriage, a rotatable shaft mounted in said carriage, means which in successive operative positions apply the rotation of said shaft to the forward and rearward traverses of said carriage and to the releasing of said interlocking parts, substantially as described.

9. In a brake device for a tool-operating machine which includes a bed and a carriage movable thereon, the combination of means for locking said carriage against movement upon said bed at successive points in the traverse thereof, a spacing device borne by said bed, a finger mounted upon said carriage and movable on engagement with said spacing device, and means for operating said locking means upon such movement of said finger, substantially as described.

10. In a brake device for a tool-operating machine which includes a bed and a carriage movable thereon, the combination of means for locking said carriage against movement upon said bed at successive points in the traverse thereof, a spacing-plate carried by said bed and provided with a series of holes, pins having heads of varying diameters replaceable in said holes, a finger mounted upon said carriage and arranged to engage pins placed in said holes as said carriage moves and means for operating said locking means upon such engagement of said finger and pins, substantially as described.

11. In a brake device for a tool-operating machine which includes movable and stationary members, a rack and a detent movable to secure said parts against movement at successive points in the traverse of said movable member, said rack and detent provided with engaging teeth, the teeth of said detent arranged in a plurality of series and the several series so arranged that adjacent teeth of the several series are staggered, substantially as described.

12. A brake device for a carriage movable upon a bed by cog and rack-rail which consists of a detent mounted in said carriage and movable to and from engagement with a rack carried by said bed, a series of spacing devices mounted in said bed, a finger borne by said carriage and arranged to engage successively the spacing devices of said series and movable on engagement with said spacing devices and on traverse of said carriage, means operative by the movement of said finger for shifting said detent into engagement with said rack, a shaft rotatably mounted in said carriage, a clutch for imparting forward movement to the cog upon rotation of said shaft in one direction, a clutch for imparting backward movement to the cog upon rotation of said shaft in opposite direction, means for shifting said latter clutch from operative position whereby said shaft may be rotated in reverse direction without moving said carriage, and means operative by such reverse rotation of said shaft for shifting said detent out of engagement with said rack and for releasing said finger from engagement with said spacing device, substantially as described.

13. In a tool-operating machine, the combination with a table and a carriage movable thereon, of a rotating shaft borne by said carriage, means for intermittently locking said carriage against movement upon said table at successive points in the range of its movement thereon, a clutch forming driving connection between said shaft and said table, means operated on the traverse of the carriage for opening said clutch and simultaneously locking said carriage, and means operated on the further operation of the machine for releasing said carriage and thereupon closing said clutch, substantially as described.

14. In a tool-operating machine, the combination with a table and a carriage movable thereon, of a shaft borne by said carriage, means for rotating said shaft, means for intermittently locking said carriage against movement upon said table at successive points in the range of its movement thereon, a clutch forming driving connection between said shaft and said table, means operated on the traverse of the carriage for opening said clutch and simultaneously locking said carriage, means for releasing said carriage, and means for moving said carriage in reverse direction upon said table, substantially as described.

15. In a tool-operating machine, the combination with a table and a carriage movable upon said table, of means for moving said carriage forward upon said table, separate means for moving said carriage rearward upon said table, means for intermittently locking said carriage against movement upon said table at successive points in the range of its movement thereon, and means operated on the forward movement of the carriage for operating said locking means, substantially as described.

16. In a tool-operating machine, the combination with a table and a carriage movable thereon, of a rotatable shaft borne by said carriage, means for intermittently locking said carriage against movement upon said table at successive points in the range of its movement thereon, a clutch forming driving connection between said shaft and table, means operated on the traverse of said carriage for operating said locking means, and means for moving said carriage in reverse direction, substantially as described.

17. In a punching-machine, the combination of a punching-head provided with gag-controlled punches, means for shifting the gags thereof, a work-sustaining table, a carriage engaging the work and movable upon said table, means for intermittently locking said carriage against movement upon said table at successive points in the range of its movement thereon, and means operated on the movement of said carriage for simultaneously operating said locking means and said gag-shifting means, substantially as described.

18. In a punching-machine, the combination of a punching-head provided with gag-controlled punches, means for shifting the gags thereof, a table, a carriage movable upon said table, a rotating shaft borne by said carriage, means for intermittently locking said carriage against movement upon said table, a clutch forming driving connection between said shaft and table, means operated on the traverse of the carriage for simultaneously opening said clutch locking said carriage and operating said gag-shifting means, and means operated on the further operation of the machine for releasing said carriage and thereupon closing said clutch, substantially as described.

19. In a tool-operating machine, the combination with a table and a carriage movable thereon, of a motor, a rotatable shaft borne by said carriage, a clutch forming driving connection between said motor and said shaft, driving connection between said shaft and said table, means for closing said clutch during the operation of said motor, and means for opening said clutch when said motor stops, substantially as described.

In testimony whereof I have hereunto set my hand.

GEORGE PAUL THOMAS.

Witnesses:
ALICE A. TRILL,
BAYARD H. CHRISTY.